(12) United States Patent
Chatani

(10) Patent No.: US 9,703,933 B2
(45) Date of Patent: *Jul. 11, 2017

(54) MANAGING TRANSFER OF CONTENT

(75) Inventor: Masayuki Chatani, Sunnyvale, CA (US)

(73) Assignee: SONY INTERACTIVE ENTERTAINMENT AMERICA LLC, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/529,669

(22) Filed: Jun. 21, 2012

(65) Prior Publication Data

US 2012/0330790 A1     Dec. 27, 2012

Related U.S. Application Data

(60) Continuation of application No. 12/011,903, filed on Jan. 29, 2008, which is a division of application No. 09/894,793, filed on Jun. 28, 2001, now abandoned.

(60) Provisional application No. 60/270,232, filed on Feb. 20, 2001.

(51) Int. Cl.
| | | |
|---|---|---|
| *G06Q 30/06* | (2012.01) | |
| *G06F 21/10* | (2013.01) | |
| *G06F 21/78* | (2013.01) | |
| *G06Q 20/10* | (2012.01) | |
| *G06Q 20/12* | (2012.01) | |
| *G06Q 30/08* | (2012.01) | |

(52) U.S. Cl.
CPC ............ *G06F 21/10* (2013.01); *G06F 21/78* (2013.01); *G06Q 20/10* (2013.01); *G06Q 20/1235* (2013.01); *G06Q 30/06* (2013.01); *G06Q 30/0601* (2013.01); *G06Q 30/0635* (2013.01); *G06F 2221/0773* (2013.01); *G06F 2221/0797* (2013.01)

(58) Field of Classification Search
CPC ................................ G06C 30/06; G06C 30/08
USPC .................................................. 705/26.1, 27.1
See application file for complete search history.

(56) References Cited

U.S. PATENT DOCUMENTS

| | | | |
|---|---|---|---|
| 5,629,980 | A | 5/1997 | Stefik et al. |
| 5,892,900 | A * | 4/1999 | Ginter et al. .................. 726/26 |
| 6,820,063 | B1 | 11/2004 | England et al. |
| 7,480,621 | B1 * | 1/2009 | Megiddo ....................... 705/301 |
| 7,613,735 | B2 | 11/2009 | Yao |
| 9,275,197 | B2 | 3/2016 | Harris |

(Continued)

OTHER PUBLICATIONS

Berinstein, Paula; "DOI: A New identifier for digital content" (Jan. 1998): 72-77.

(Continued)

*Primary Examiner* — James Zurita
(74) *Attorney, Agent, or Firm* — Polsinelli LLP

(57) ABSTRACT

A system and method for transferring ownership of disc storage media utilizing unique disc identification includes a disc storage medium with a permanently recorded disc identification, a user console with a set identification, a network, and a host server managing a user database and a disc database. Upon purchase of software stored on a disc storage medium, the unique disc identification and user identification are transmitted over the network from the user console to the host server. The host server grants the user console access permission to the programs residing on the disc storage medium and performs the disc ownership transfer transactions.

21 Claims, 5 Drawing Sheets

(56) References Cited

U.S. PATENT DOCUMENTS

| | | |
|---|---|---|
| 2004/0220878 A1 | 11/2004 | Lao et al. |
| 2008/0256592 A1 | 10/2008 | Schnell et al. |
| 2009/0083281 A1 | 3/2009 | Sarig et al. |
| 2009/0083541 A1 | 3/2009 | Levine |
| 2010/0299151 A1 | 11/2010 | Soroka et al. |

OTHER PUBLICATIONS

U.S. Appl. No. 12/011,903 Office Action mailed Mar. 6, 2014.
U.S. Appl. No. 12/011,903 Final Office Action mailed Jun. 16, 2014.
U.S. Appl. No. 13/220,157 Office Action mailed Aug. 7, 2014.
U.S. Appl. No. 13/220,157 Final Office Action mailed Jun. 21, 2013.
U.S. Appl. No. 13/220,157 Office Action mailed Mar. 6, 2013.
U.S. Appl. No. 12/011,903 Office Action mailed Jan. 6, 2015.
U.S. Appl. No. 12/473,668 Office Action mailed Feb. 11, 2016.
U.S. Appl. No. 12/506,076 Office Action mailed Jun. 17, 2016.
U.S. Appl. No. 12/506,076 Office Action mailed Feb. 25, 2016.
Merriam-Webster Online, Definition of "privilege", Apr. 25, 2009.
U.S. Appl. No. 13/220,157 Office Action mailed Jul. 30, 2015.
Bidwell, Percy W.; Imports in the American Economy, Foreign Affairs (pre-1986); Oct. 1945;24, ProQuest Central, pp. 85-98, total 14 pages.
Classified Ad 4—no title (May 29, 1852. New York Daily Times (1851-1857).
Digital Music Industry Leaders Line Up to Support iPin's E-Content Payment System PR Newswire [New York] Sep. 20, 1999: 1. Downloaded from ProQuestDirect on the Internet on Sep. 27, 2016, 4 pages.
Martin, Thomas; Ancient Greece: from prehistoric to Hellenistic Times, Yale University, 1996. pp. 11-12, total 2 pages.
U.S. Appl. No. 12/011,903 Office Action mailed Oct. 3, 2016.
Kuchera, Ben; "Nintendo's Wii Speak a new front in a war against used games", Nov. 13, 2008 7:30pm, ARS technica, retrieved from http://arstechnica.com/gaming/2008/11/nintendos-wii-speak-a-new-front-in-war-against-used-games/ on Jan. 2, 2017 saved as (Nintendo Wii Speak a new front in war against used games.pdf).
Stuart, Keith; "Michael Capps—Part Two Epic's president offers his views on retail vs. digital distribution argument . . .", Nov. 10, 2008 Gamesindustry.biz, retrieved from http://www.gamesindustry.biz/articles/michael-capps-part-two on Jan. 2, 2017 saved as (michael-capps-part-two.pdf).
U.S. Appl. No. 12/473,668 Final Office Action mailed Jan. 10, 2017.
Bendel, Mike; "Epic: Used Game Market is a huge issue, Publishers Exploring Ways to Combat", Nov. 10, 2008, https://www.exophase.com/8895/epic-used-game-market-is-a-huge-issue-publishers-exploring-ways-to-combat/.
U.S. Appl. No. 12/011,903 Office Action mailed Apr. 14, 2017.
U.S. Appl. No. 12/473,668 Office Action mailed May 22, 2017.

* cited by examiner

Disc Storage
Medium

MANAGING TRANSFER OF CONTENT

CROSS-REFERENCE TO RELATED APPLICATIONS

This application is a continuation and claims the priority benefit of U.S. patent application Ser. No. 12/011,903 filed Jan. 29, 2008, which is a divisional and claims the priority benefit of U.S. patent application Ser. No. 09/894,793 filed Jun. 28, 2001, which claims the priority benefit of U.S. provisional patent application No. 60/270,232 filed Feb. 20, 2001, the disclosures of which are incorporated herein by reference.

BACKGROUND OF THE INVENTION

Field of the Invention

This invention relates generally to electronic processing systems and more particularly to a disc ownership transfer system utilizing unique disc identification to authorize access to disc storage media.

Description of the Related Art

Disc storage media, such as CD-ROM and DVD-ROM storage discs, are typical storage devices for commercially available software programs. For example, publishers and manufacturers of games for electronic gaming systems use read-only storage devices such as CD-ROM discs to distribute and sell their products. Discs may be passed and shared among users; however, there is no effective system in place to account for the potential multiple users of commercially available software products.

Even though discs may be shared without any constraints, it may be that discs are shared only between small groups of users without widespread distribution among the entire user population. The software product is not widely shared, thereby forcing others to purchase their own copy. The software product does not achieve widespread advertising either, limiting the potential for a larger consumer base. For example, the publishers and distributors of game software would like their products advertised to a wide customer base as well as purchased by a wide customer base.

A system that would facilitate an owner of a software product stored on a disc storage medium to sell the disc storage medium to others, is a concern of publishers, distributors, and users of software products. A user may tire of a product on a disc, but instead of storing the disc away, maybe never to be seen again, the user may be offered an opportunity to transfer ownership to another user. Such a system could benefit the publishers and distributors of software products stored on discs by (1) promoting the products and (2) attracting other users who may purchase more products in the future. In addition, such a system could benefit the owner of a software product by providing a method of collecting royalties on the sale of the owner's software product. Finally, such a system could benefit the other potential users of software products by providing a system of purchasing used software programs at less than retail cost.

SUMMARY OF THE CLAIMED INVENTION

An embodiment of the presently claimed invention is for a system for managing transfer of ownership of stored content. The system includes a computing device to transmit an identification of the stored content over a network. A host server receives the identification of the stored content and compares the received identification of the stored content with ownership information. The host server processes a transfer of ownership transaction including permission to access the stored content by a new owner of the stored content.

An embodiment of the presently claimed invention is for a method for managing transfer of ownership of stored content. The method includes the step of receiving an identification of the stored content, the identification having been transmitted over a network. The method further includes comparing the received identification of the stored content with ownership information and processing a transfer of ownership, the transfer of ownership including permission.

A still further embodiment of the presently claimed invention includes a computer-readable storage medium having embodied thereon a program. The program is executable by a processor to perform a method for managing transfer of ownership of stored content. The method includes the step of receiving an identification of the stored content, the identification having been transmitted over a network. The method further includes comparing the received identification of the stored content with ownership information and processing a transfer of ownership, the transfer of ownership including permission.

DETAILED DESCRIPTION

Figure 1:
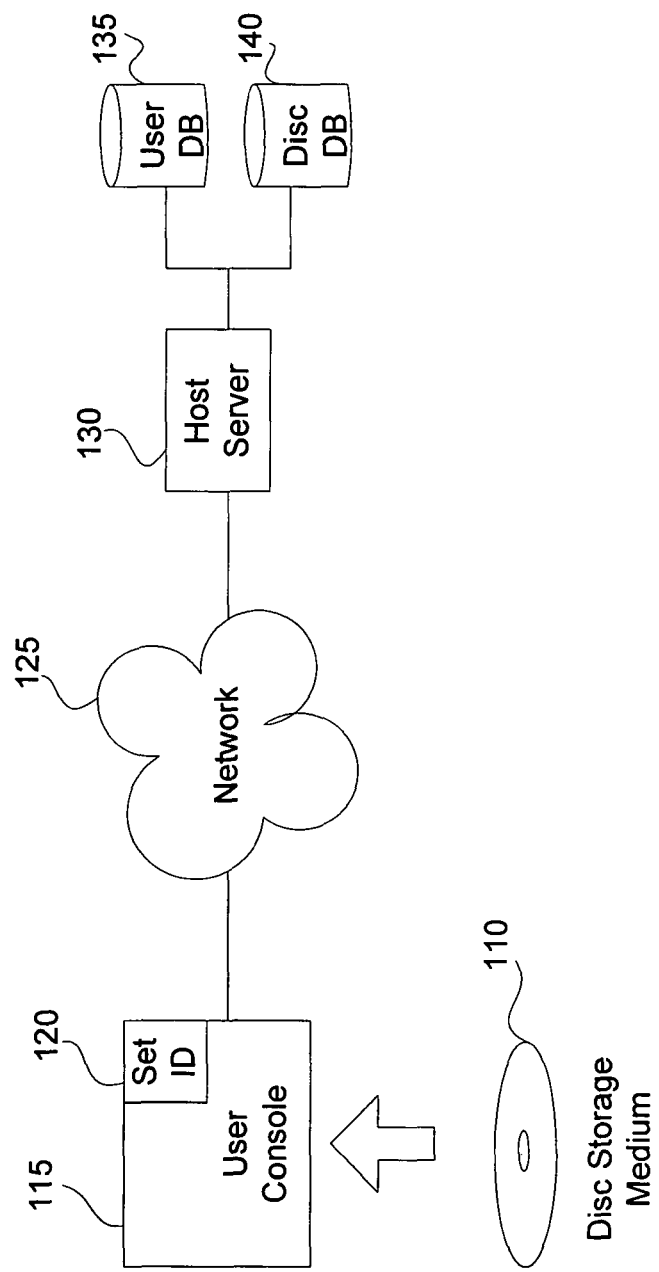
FIG. 1 is a block diagram of one embodiment of an electronic processing system according to the invention.

FIG. 1 is a block diagram of one embodiment of an electronic processing system according to the invention. The processing system includes, but is not limited to, a disc storage medium (disc) 110, a user console 115, a set identification (ID) 120, a network 125, a host server 130, a user database (DB) 135, and a disc database (DB) 140.

The disc 110 is a read-only storage device such as a CD-ROM or a DVD-ROM. As will be discussed further below in conjunction with FIG. 2, a disc identification is stored on the disc 110 to uniquely identify the disc 110.

The user console 115 is an electronic device, such as an electronic gaming system, a general-purpose computer, or a set-top box, that may access the contents of the disc 110. The user console 115 has an interface to the network 125. The network 125 may be a local area network (LAN), a wide area network (WAN), a wireless network, a cable network, or the Internet. The Internet is a broad network of interconnected computers and servers allowing for the transmission and exchange of Internet Protocol (IP) data between users connected to the Internet through a network service provider.

Examples of network service providers are the public switched telephone network, a cable service provider, or a satellite service provider.

The user console 115 may be configured to access data from other removable storage media, such as memory cards, floppy discs, or hard disc drives.

During a first use of the user console 115, a user registers the user console 115 with the host server 130. The user console 115 may be registered and identified by either a set ID 120 or a USER ID. The host server 130 stores the set ID 120, the USER ID, or both in the user database 135. As further discussed below in conjunction with FIG. 5, the first time user of the user console 115 will be prompted by the host server 130 to enter user information. This user information will be used to associate a USER ID with a user. In the preferred embodiment of the invention, the USER ID identifies users. However, the set ID 120 may be used instead of the USER ID to identify users.

The host server 130 stores data in the user database 135 and the disc database 140. The databases will be discussed in more detail below in conjunction with FIGS. 3A-3B.

Figure 2:
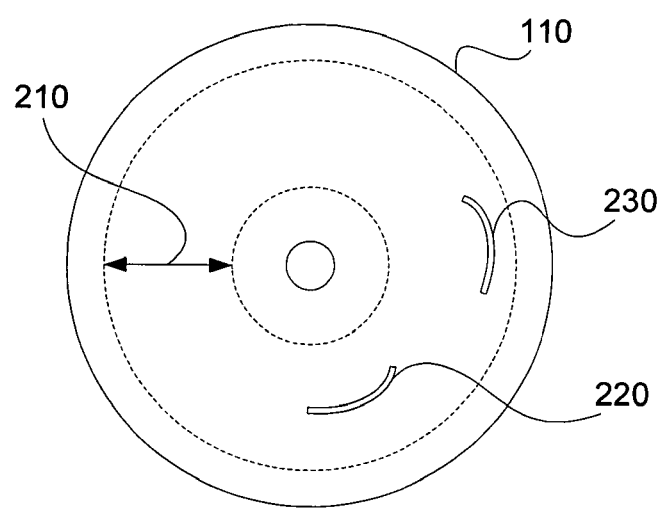
FIG. 2 is a diagram of one embodiment of the disc storage medium of FIG. 1 according to the invention.

FIG. 2 is a diagram of one embodiment of the disc 110 according to the invention. The disc 110 includes, but is not limited to, a data access area 210, a DISC UNIQUE ID address 220, and a DISC UNIQUE ID 230. The disc 110 has a data access area 210 delineated by an inner and outer radius. Data is typically recorded within the data access area 210. The data may include software programs, video data, audio data, or any other type of stored content. Although FIG. 2 shows the DISC UNIQUE ID address 220 and the DISC UNIQUE ID 230 recorded within the data access area 210, either can be recorded outside of the data access area 210.

The DISC UNIQUE ID address 220 contains the disc address of the DISC UNIQUE ID 230. The DISC UNIQUE ID 230 uniquely identifies the disc 110. The contents of the disc 110 cannot be played on the user console 115 or other devices without access permission for the disc 110. Access instructions are sent to the user console 115 from the host server 130 upon receipt of the DISC UNIQUE ID 230 and the USER ID by the host server 130 from the user console 115. Access permission and transfer of disc ownership will be discussed below in conjunction with FIGS. 4-5.

Figure 3:
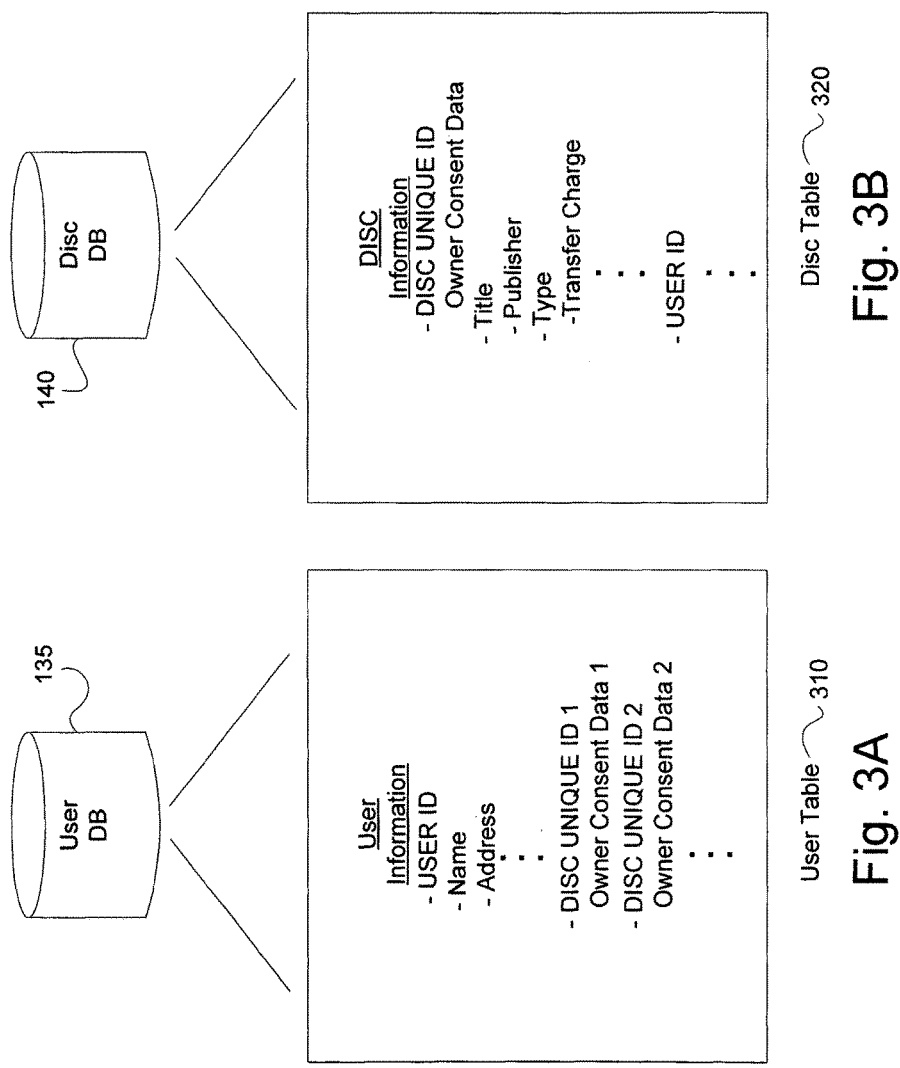
FIG. 3A shows one embodiment of the user database managed by the host server of FIG. 1 according to the invention.
FIG. 3B shows one embodiment of the disc database managed by the host server of FIG. 1 according to the invention.

FIG. 3A shows one embodiment of the user database 135 of FIG. 1 according to the invention. The user database 135 has a user table 310 including user information. User information includes the USER ID and may also include, for example, user name, address, billing information, and user preferences. The user table 310 may also include a plurality of DISC UNIQUE IDs that are associated with each USER ID. Each DISC UNIQUE ID has associated owner consent data. The owner consent data is a data field that contains information regarding the transfer of disc ownership to another user.

FIG. 3B shows one embodiment of the disc database 140 of FIG. 1 according to the invention. The disc database 140 has a disc table 320 including disc information. The disc information includes the DISC UNIQUE ID accompanied by owner consent data and may also include, for example, title, publisher, type, date of purchase, and transfer charge. The disc table 320 may also contain a USER ID associated with each DISC UNIQUE ID. The transfer charge data field includes the payment amount due the user upon transfer of disc ownership to another user.

The transfer charge data field may include other data relevant to charges incurred when ownership of a disc 110 is transferred. For example, a transfer of ownership may also include a royalty payment to the developer of the content of the disc 110, the publisher of the disc 110, or both. A transfer of ownership may also include a royalty payment to a developer of the user console 115. Thus the host server 130 may be further configured to manage other databases that store royalty payment information regarding developers and publishers.

Figure 4:
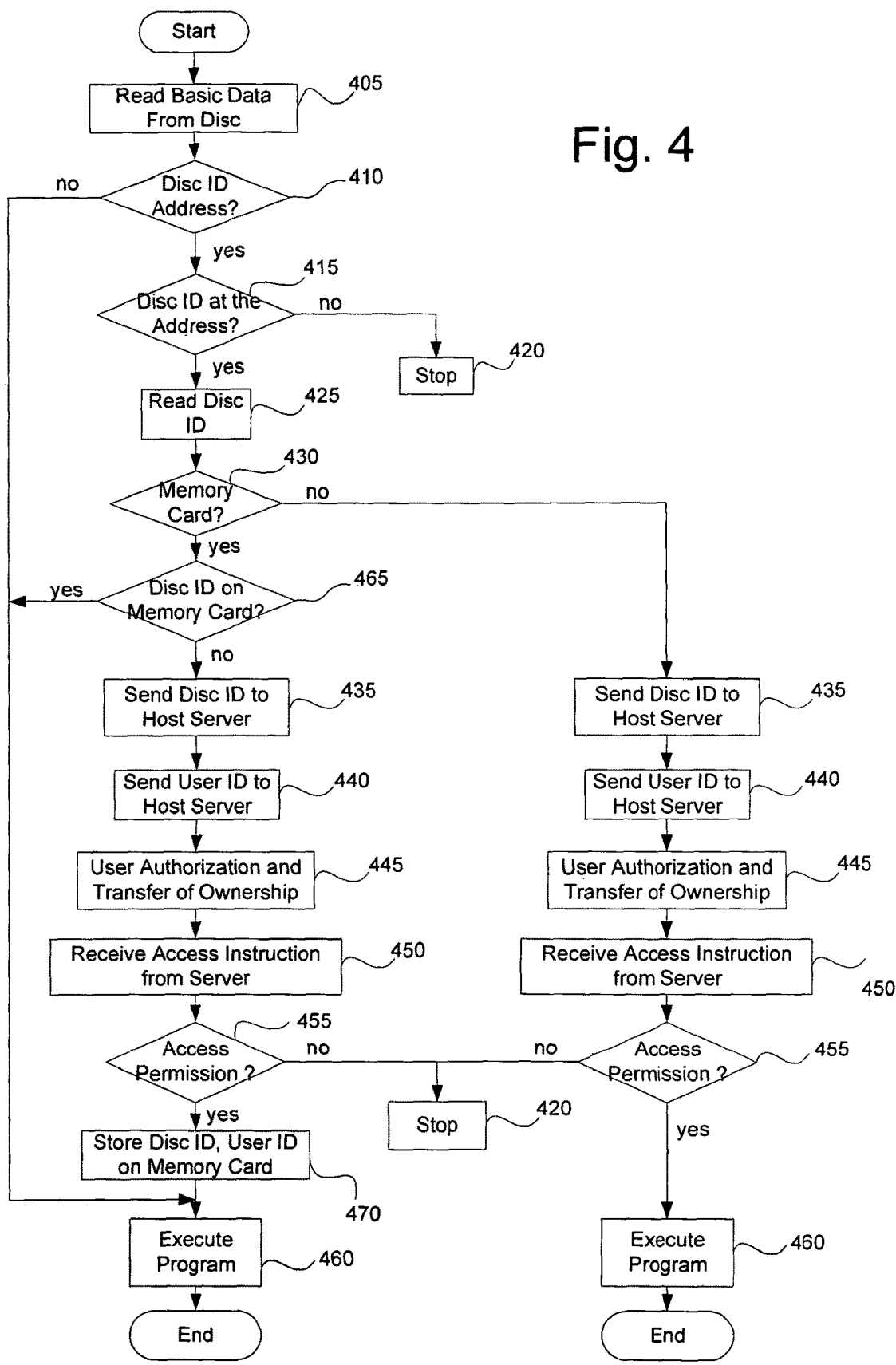
FIG. 4 is a flowchart of method steps for acquiring disc access permission according to one embodiment of the invention.

FIG. 4 is a flowchart of method steps for a user to acquire access permission for a disc 110 on the user console 115, according to one embodiment of the invention. First, in step 405, the user console 115 reads basic data from the disc 110. In step 410, the user console 115 determines if a DISC UNIQUE ID address 220 is stored on the disc 110. If the DISC UNIQUE ID address 220 does not exist, then the method continues with step 460, and the disc program is executed. However, if a DISC UNIQUE ID address 220 does exist, then, in step 415, the user console 115 determines whether a DISC UNIQUE ID 230 is stored at the location given by the DISC UNIQUE ID address 220. If there is no DISC UNIQUE ID 230 recorded, then disc program execution is stopped in step 420. If there is a DISC UNIQUE ID 230 recorded, then, in step 425, the DISC UNIQUE ID 230 is read by the user console 115. In step 430, the user console 115 determines if a memory card is present. The memory card is a removable storage device compatible with the user console 115 or other user consoles that may store data such as USER ID and DISC UNIQUE ID 230.

The FIG. 4 embodiment shows two paths to gain access permission to the disc. If a memory card is not present in user console 115, then the DISC UNIQUE ID 230 and USER ID will be sent to the host server 130 every time the disc 110 is booted. If a memory card is present, then the DISC UNIQUE ID 230 and USER ID is only sent to the host server 130 the first time a user boots the disc 110. When the same user boots the disc 110 on subsequent occasions, host server 130 access is not needed to access the disc 110. Instead of sending the USER ID and DISC UNIQUE ID 230 to the host server 130 for access confirmation, the USER ID and DISC UNIQUE ID 230 stored on the memory card are used to confirm or deny access to disc 110.

In step 430, if the user console 115 determines that a memory card is not present, then, in step 435, the user console 115 sends the DISC UNIQUE ID 230 to the host server 130. In step 440, the USER ID is sent to the host server 130. In step 445, access instructions regarding user authorization are generated and, if appropriate, a transaction of transfer of disc ownership is made and changes in disc ownership are recorded in the appropriate data fields in the user database 135 and disc database 140. The details of step 445 will be discussed in more detail in conjunction with FIG. 5.

In step 450, the user console 115 receives from the host server 130 the access instructions. If access permission is granted, step 455, then disc program execution can commence in step 460. However, if access permission is not granted, disc program execution is stopped in step 420. The details regarding access permission and access denial will be discussed below in conjunction with FIG. 5.

Returning to step 430, if the user console 115 determines that a memory card is present, then, in step 465, the user console 115 determines whether the DISC UNIQUE ID 230 is recorded on the memory card. If the DISC UNIQUE ID 230 is stored on the memory card, then the host server 130 is not contacted and the disc program can be executed in step 460. However, if the user console 115 determines that the DISC UNIQUE ID 230 is not stored on the memory card, then in step 435 the user console 115 sends the DISC UNIQUE ID 230 to the host server 130. In step 440, the user console 115 sends the USER ID to the host server 130. In step 445, access instructions regarding user authorization are generated and, if appropriate, a transaction of transfer of disc ownership is made and changes in disc ownership are recorded in the appropriate data fields in the user database 135 and disc database 140. In step 450, the user console 115 receives access instructions from the host server 130. In step 455, if access permission is granted, then, in step 470, the DISC UNIQUE ID 230 and USER ID are stored on the memory card and, in step 460, the disc program is executed. Consequently, the next time the user boots up the disc 110 with the same memory card installed, the host server 130 does not need to be contacted for access permission.

Figure 5:
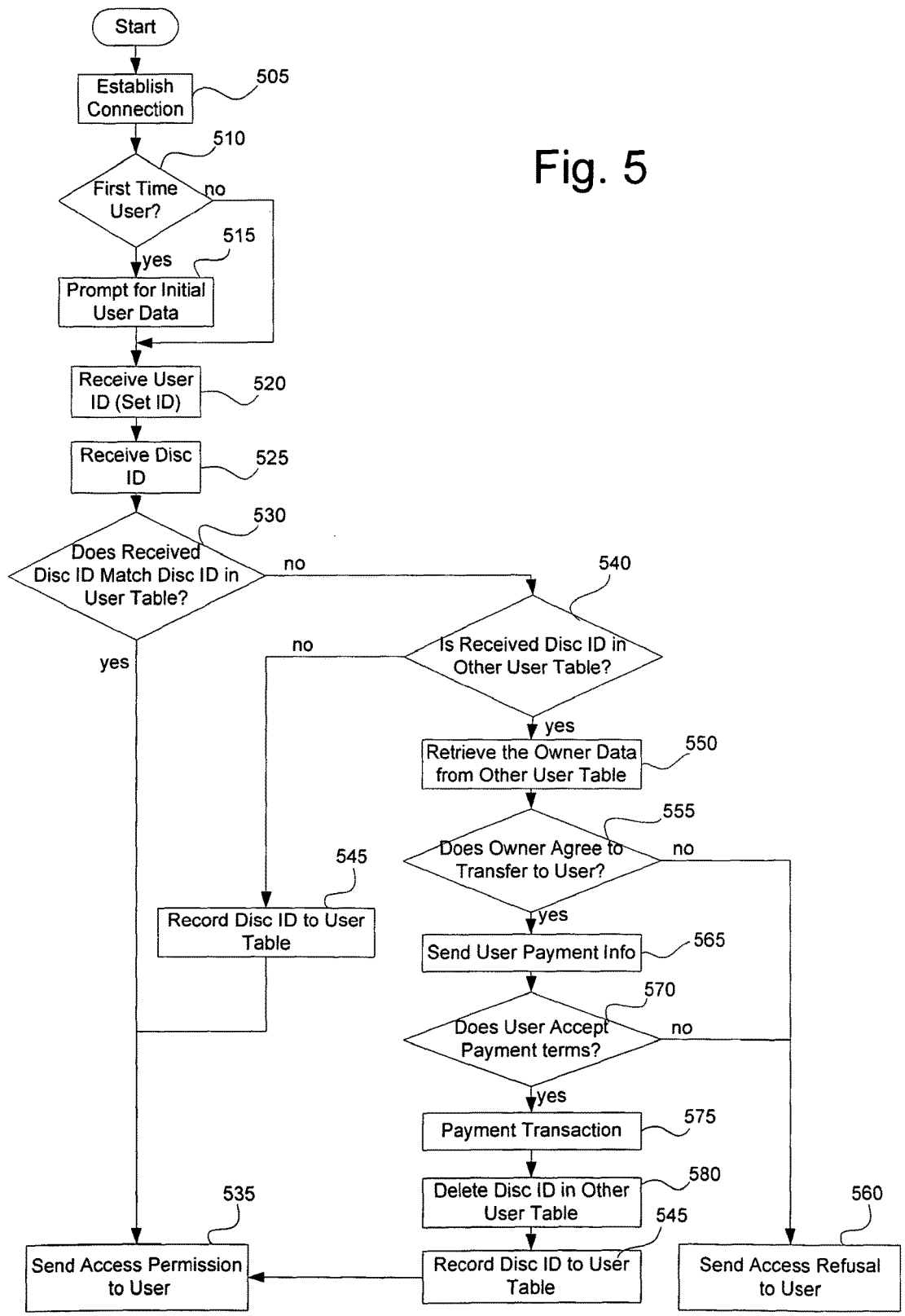
FIG. 5 is a flowchart of method steps for granting disc access permission and transacting a transfer of disc ownership according to one embodiment of the invention.

FIG. 5 is a flowchart of method steps for granting disc access permission and transacting a transfer of disc ownership, according to one embodiment of the invention. First, in step 505, a network connection is established from the user console 115 to the host server 130. Then, in step 510, the host server 130 determines whether the user is a first time user. If the user is a first time user, then, in step 515, the host server 130 prompts the user for initial user data. The user is then assigned a USER ID by host server 130. If the user is not a first time user, then step 515 is skipped. In steps 520 and 525 the host server 130 receives the USER ID (or set ID) and DISC UNIQUE ID 230 from the user console 115, respectively.

In step 530, the host server 130 accesses the user database 135 associated with the USER ID and determines if the received DISC UNIQUE ID 230 matches any of the DISC UNIQUE IDs in the user table 310. If there is a match, then the disc 110 has been previously played by the user. Subsequently, in step 535, access permission is sent to the user console 115.

However, if the received DISC UNIQUE ID 230 does not match any of the DISC UNIQUE IDs in the user table 310 in step 530, then, in step 540, the host server 130 searches for the received DISC UNIQUE ID 230 in other user's user tables. If the host server 130 does not locate a match, then the disc 110 associated with the received DISC UNIQUE ID 230 has been purchased new by the user and never played. Therefore, in step 545, the DISC UNIQUE ID 230 is recorded to the user table 310. The DISC UNIQUE ID 230 may also be recorded to the disc table 320 in the disc database 140. Finally, in step 535, the host server 130 sends access permission to the user console 115.

If, in step 540, the host server 130 does match the received DISC UNIQUE ID 230 to a DISC UNIQUE ID in another user's user table, then another user owns the disc 110. Therefore, in step 550, the host server 130 retrieves the owner data from the other user's user table, including the other user's owner consent data. If the other user has not agreed to transfer disc ownership, then the user is denied access in step 560. However, if the other user has agreed to transfer disc ownership, then, in step 565, the host server 130 sends the user console 115 payment information. If, in step 570, the user decides not to accept payment terms for the transfer of the disc ownership to the user, then the user is refused access in step 560. However, in step 570, if the user decides to accept payment terms for the transfer of the disc ownership to the user, then the host server 130 enables a payment transaction in step 575.

The other user is typically the recipient of the payment; however, the payment transaction may also include a royalty payment or license fee to the developer or publisher of the content on the disc 110. If the disc 110 is a gift from the other user, the payment transaction may only include a royalty payment or license fee.

The payment amount reflects the value of the disc 110, and may be based, for example, on the popularity of the software stored on the disc 110 or the period of time elapsed since the disc 110 was launched. In step 580, the host server 130 deletes the DISC UNIQUE ID in the other user's user table. In step 545, the host server 130 records the DISC UNIQUE ID 230 to the user's user table 310. Finally, in step 535, the host server 130 sends the user console 115 access permission.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for managing stored user records regarding ownership of stored content, the system comprising:
a memory for storing consent data in user records, each stored user record regarding content owned by an associated user, wherein the stored consent data indicates whether the associated user has agreed to transfer ownership of the content;
a communication interface that receives an access request indicating that a requesting user wishes to access requested content owned by another user, the requesting user identified by a unique user identifier; and
a processor for executing instructions stored in memory, wherein execution of the instructions by the processor:
matches the unique user identifier to a corresponding user record stored in memory,
identifies that ownership information associated with the corresponding stored user record indicates that the requesting user is not the owner of the requested content, wherein a stored user record associated with another user indicates the other user is the owner of the requested content,
identifies that the stored user record associated with the other user includes stored consent data indicating that the other user has agreed to transfer ownership of the requested content to the requesting user, wherein access to the requested content is associated with ownership of a uniquely identified storage medium that stores the requested content, and
updates the stored user records associated with the requesting user and the other user regarding the requested content to reflect that the requesting user is the owner of the requested content via the uniquely identified storage medium that stores the requested content, the update based on the stored consent data in the stored user record associated with the other user indicating the other user has agreed to transfer ownership of the uniquely identified storage medium that stores the requested content, wherein the access request is granted based on the updated user record associated with the requesting user reflecting that the requesting user is the owner of the uniquely identified storage medium that stores the requested content.

2. The system of claim 1, wherein the communications interface further receives an indication of acceptance from the requesting user prior to the updating of the stored user record associated with the requesting user to reflect that the requesting user is the owner of the requested content.

3. The system of claim 1, wherein the transfer of ownership transaction comprises a financial transaction.

4. The system of claim 3, wherein the financial transaction involves the other user submitting a payment.

5. The system of claim 3, wherein the financial transaction involves the requesting user submitting a payment.

6. The system of claim 1, wherein the requested content is stored locally.

7. The system of claim 1, wherein the requested content is stored remotely.

8. A method for managing stored user records regarding ownership of stored content, the method comprising:
   storing consent data in user records, each stored user record regarding content owned by an associated user, wherein the stored consent data indicates whether the associated user has agreed to transfer ownership of the content;
   receiving an access request indicating that a requesting user wishes to access requested content owned by another user, the requesting user identified by a unique user identifier; and
   executing instructions stored in memory, wherein execution of the instructions by a processor:
      matches the unique user identifier to a corresponding user record stored in memory,
      identifies that ownership information associated with the corresponding stored user record indicates that the requesting user is not the owner of the requested content, wherein a stored user record associated with another user indicates the other user is the owner of the requested content,
      identifies that the stored user record associated with the other user includes stored consent data indicating that the other user has agreed to transfer ownership of the requested content to the requesting user, wherein access to the requested content is associated with ownership of a uniquely identified storage medium that stores the requested content, and
      updates the stored user records associated with the requesting user and the other user regarding the requested content to reflect that the requesting user is the owner of the requested content via the uniquely identified storage medium that stores the requested content, the update based on the stored consent data in the stored user record associated with the other user indicating the other user has agreed to transfer ownership of the uniquely identified storage medium that stores the requested content, wherein the access request is granted based on the updated user record associated with the requesting user reflecting that the requesting user is the owner of the uniquely identified storage medium that stores the requested content.

9. The method of claim 8, wherein the communications interface further receives an indication of acceptance from the requesting user prior to the updating of the stored user record associated with the requesting user to reflect that the requesting user is the owner of the requested content.

10. The method of claim 8, wherein the transfer of ownership transaction comprises a financial transaction.

11. The method of claim 10, wherein the financial transaction involves the other user submitting a payment.

12. The method of claim 10, wherein the financial transaction involves the requesting user submitting a payment.

13. The method of claim 8, wherein the requested content is stored locally.

14. The method of claim 8, wherein the requested content is stored remotely.

15. A non-transitory computer-readable storage medium, having embodied thereon a program executable by a processor to perform a method for managing stored user records regarding ownership of stored content, the method comprising:
   storing consent data in user records, each stored user record regarding content owned by an associated user, wherein the stored consent data indicates whether the associated user has agreed to transfer ownership of the content;
   receiving an access request indicating that a requesting user wishes to access requested content owned by another user, the requesting user identified by a unique user identifier;
   matching the unique user identifier to a corresponding user record stored in memory;
   identifying that ownership information associated with the corresponding stored user record indicates that the requesting user is not the owner of the requested content, wherein a stored user record associated with another user indicates the other user is the owner of the requested content;
   identifying that the stored user record associated with the other user includes stored consent data indicating that the other user has agreed to transfer ownership of the requested content to the requesting user, wherein access to the requested content is associated with ownership of a uniquely identified storage medium that stores the requested content; and
   updating the stored user records associated with the requesting user and the other user regarding the requested content to reflect that the requesting user is the owner of the requested content via the uniquely identified storage medium that stores the requested content, the update based on the stored consent data in the stored user record associated with the other user indicating the other user has agreed to transfer ownership of the uniquely identified storage medium that stores the requested content, wherein the access request is granted based on the updated user record associated with the requesting user reflecting that the requesting user is the owner of the uniquely identified storage medium that stores the requested content.

16. The non-transitory computer-readable storage medium of claim 15, wherein an indication of acceptance is received from the requesting user prior to the updating of the stored user record associated with the requesting user to reflect that the requesting user is the owner of the requested content.

17. The non-transitory computer-readable storage medium of claim 15, wherein the transfer of ownership transaction comprises a financial transaction.

18. The non-transitory computer-readable storage medium of claim 17, wherein the financial transaction involves the other user submitting a payment.

19. The non-transitory computer-readable storage medium of claim 17, wherein the financial transaction involves the requesting user submitting a payment.

20. The non-transitory computer-readable storage medium of claim 15, wherein the requested content is stored locally.

21. The non-transitory computer-readable storage medium of claim 15, wherein the requested content is stored remotely.

* * * * *